United States Patent [19]

Adams

[11] Patent Number: 5,529,534
[45] Date of Patent: Jun. 25, 1996

[54] FISH STEAK BONE AND SKIN REMOVAL APPARATUS

[76] Inventor: Thomas W. Adams, 12469 Sunrise Dr., NE., Bainbridge Is., Wash. 98110

[21] Appl. No.: 345,636

[22] Filed: Nov. 25, 1994

[51] Int. Cl.⁶ .................................................. A22C 17/04
[52] U.S. Cl. ..................... 452/135; 452/137; 30/123.7; 30/158
[58] Field of Search ................................. 452/135, 137; 30/123.7, 123.5, 123, 148, 155, 158, 351

[56] References Cited

U.S. PATENT DOCUMENTS

| | | | |
|---|---|---|---|
| 954,084 | 4/1910 | Gelbman | 452/137 |
| 1,204,676 | 11/1916 | Machuga | 30/123 |
| 1,324,565 | 12/1919 | Przybylek | 30/148 |
| 1,456,844 | 5/1923 | Debie | 30/155 |
| 2,030,463 | 2/1936 | Nelms | 452/137 |
| 2,622,729 | 12/1952 | Uttz | 30/123 |
| 2,793,392 | 5/1957 | Cutrera | 452/137 |
| 5,015,252 | 5/1991 | Jones | 30/155 |

FOREIGN PATENT DOCUMENTS 270722 10/1927 United Kingdom ................... 452/137

*Primary Examiner*—Willis Little
*Attorney, Agent, or Firm*—Robert W. Jenny

[57] ABSTRACT

The subject apparatus includes three implements which complement each other in the removal of skin portions, abdominal lining portions and bone portions from a fish steak. One implement is tongs having a plurality of tips which are pressed into the steak, surrounding the central bone portions, allowing their removal by pressing the tips toward each other to grasp and then remove those portions. A second implement is a blade on a handle. The blade is essentially perpendicular to the handle, sharp on both edges and its broad surfaces are perpendicular to the long axis of the handle. The blade is passed between the flesh portions of the steak and the skin portion and the abdominal cavity lining portion (if any) to separate and allow removal of those portions. A third implement is a tweezers specially adapted to grasping the ends of bones which extend through the steak perpendicular to its broad, flat surfaces and to grasping and removing the free skin and lining portions.

2 Claims, 2 Drawing Sheets

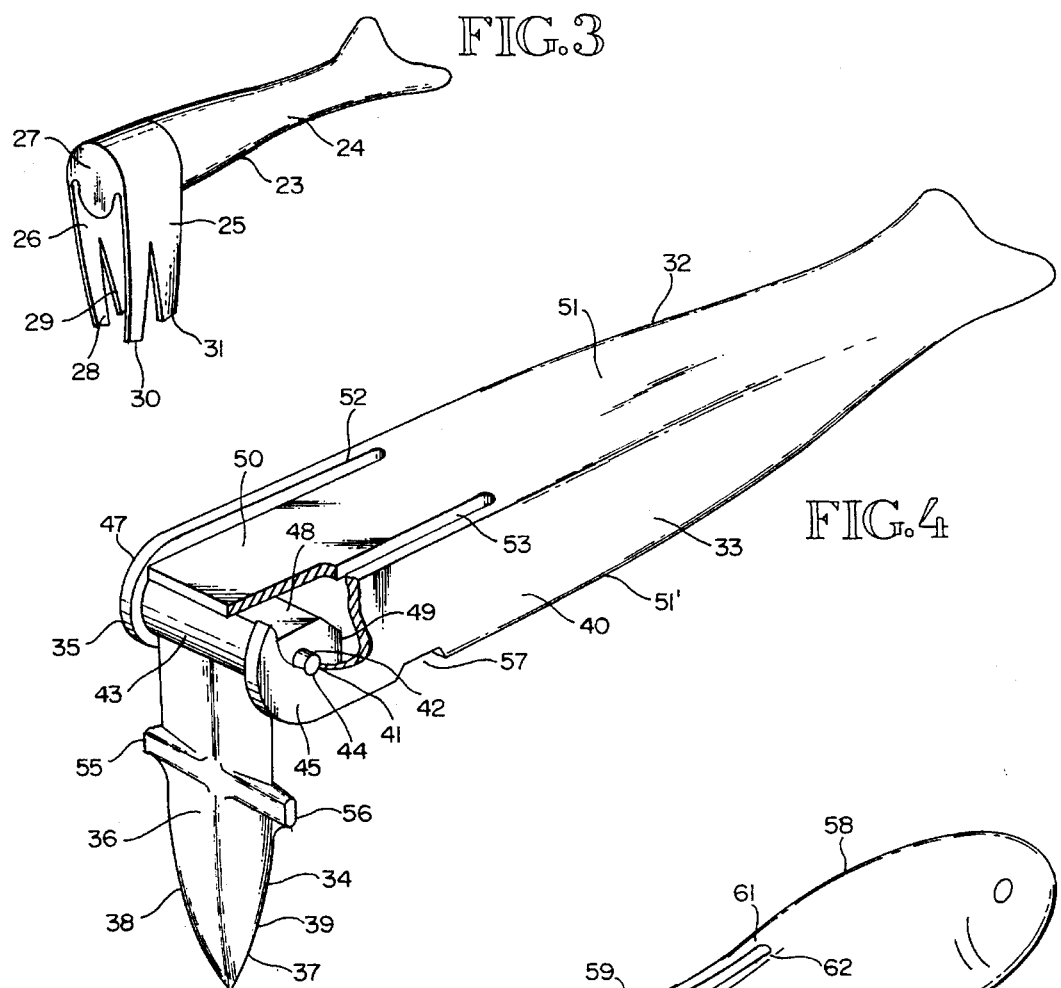

FISH STEAK BONE AND SKIN REMOVAL APPARATUS

BACKGROUND OF THE INVENTION

1. Field

The subject invention is in the fields of hand tools and cooking implements. More specifically it is in the field of implements useful in preparing and serving fish and, still more specifically fish steaks. For purposes of this disclosure a fish steak is a portion of a fish cut from the fish perpendicular to the length of the fish. Salmon and halibut are two examples of fish which are often cut into steaks for sale and consumption.

2. Prior Art

Fish steaks are often served with portions of bone still in the steak and with the edible portion still surrounded by skin and material which lines the abdominal cavity, if any. The satisfaction of eating the fish is greatest while the fish is at the serving temperature. However, eating the fish at that temperature is hampered by the necessity of somehow dealing with the inedible bones, skin and lining material. Therefore the satisfaction of eating a fish steak would be significantly enhanced if the skin, bones and lining material were removed before serving of the steak and particularly so if the skin and bones were removed so quickly that the fish is still at serving temperature when served free of the skin, bones and any lining material.

There are no implements known to the inventor of the subject invention made and provided for the specific purposes of expeditiously removing bone elements and skin from a fully cooked fish steak. The removals are conventionally done using standard utensils such as a table knife and fork immediately before or during consumption of the steak. In either case consuming the steak is complicated by the procedure, the fish is cooling unnecessarily and the skin and bones may be left on the serving plate, all detracting from the satisfaction of consuming the fish steak.

Accordingly, the primary objective of the subject invention is to provide a combination of implements for expeditiously removing the skin and abdominal lining and bones portions from a fish steak at the time of serving. Secondary objectives are that the implement(s) be easy to use, economical to manufacture and aesthetically pleasing.

SUMMARY OF THE INVENTION

The subject invention is a set of implements useful in the expeditious removal of skin and bone components from a fish steak. The implements may be attached to a common handle and in that case the invention becomes a multi purpose implement rather than a set of implements. One implement can be described as a set of tongs, or, for purposes of this disclosure a tongs. In a preferred embodiment the tongs has two pairs of opposed legs attached to a handle and extending essentially parallel to the long axis of the tongs. In use the free ends of the legs are inserted into the steak around the segment of backbone in the steak and then pressed against the bone segment so that the segment can be lifted out of the steak.

A second implement is a flat pointed double edged blade long enough to penetrate the fish steak from one face through to the other. The blade is attached to a handle which makes it easy to insert the blade perpendicular to the broad surfaces of the steak and between the skin portions and flesh portions of the steak. The blade is then moved all around the periphery of the steak to separate the skin and the abdominal lining of the intestinal cavity from the flesh portions of the steak, allowing easy removal of the skin and intestinal cavity lining including the bones in it from the steak.

In this preferred embodiment the tongs and blade described above may be attached to opposite ends of a common handle.

In this preferred embodiment the blade is pivotally connected to one end of the handle so that it is adjustable from its in use position to a stowed position in which the sharp edges of the knife blade are shielded in the handle to protect the blade and to reduce the chances of injuries while the implement is being handled without the blade in use. The pivotal connection is such that the broad faces of the blade are perpendicular to the long axis of the handle. With this arrangement the handle of the blade is moved sidewise to use the blade.

This removal is facilitated by a third implement which is a set of tweezers, termed tweezers for purposes of this disclosure. The tweezers is also used to remove other bone segments often found in fish steaks. These other segments are parallel to the backbone of the whole fish and therefore perpendicular to the flat surfaces of the steak. They are removed by grasping an end of each bone portion with the tweezers and pulling the bone from the steak.

The tweezers may be of conventional configuration with fairly wide tips on the free ends of the legs to facilitate grasping individual bones and bone segments as well as the skin and lining portions cut free with the blade. In a preferred embodiment the knife handle is shaped to resemble a fish and the tail end of the handle is slotted to form the tweezers. In an alternate embodiment of the apparatus the tweezers is a separate implement, preferably resembling a fish or some other form of sea life such as a crab claw.

In use of the subject invention it has been found to be most expeditious to use the blade first to free the skin and lining portions, then the tweezers to remove the skin and lining and separate bone segments and then the tongs to remove the backbone segment.

The invention is described in more detail below with reference to the attached drawings.

BRIEF DESCRIPTION OF THE DRAWINGS

FIG. 1 illustrates one form of fish steak, such as one cut from a salmon.

FIG. 2 illustrates a second form of fish steak, such as one cut from a halibut.

FIG. 3 illustrates the tongs used for removing portions of backbone from fish steaks.

FIG. 4 illustrates an implement used for separating skin and abdominal lining portions from fish steaks.

FIG. 5 illustrates a tweezers used for removing bone portions and skin and lining portions from fish steaks.

DETAILED DESCRIPTION OF THE INVENTION

Figure 6:
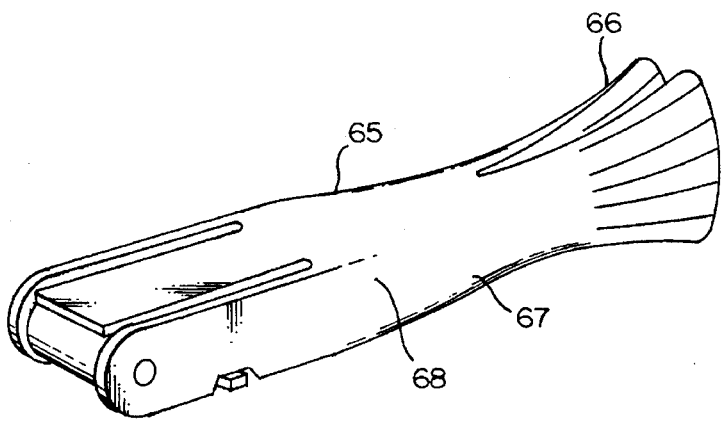
FIG. 6 illustrates an implement combining the implement of FIG. 4 with the tweezers of FIG. 5.

The subject invention is apparatus for removing bone portions, skin portions and abdominal lining portions from fish steaks. The abdominal lining portions often comprise bones and cartilage-like tissue. FIG. 1 illustrates a fish steak 10 cut from a salmon. The steak comprises flesh portions 11 and 12, a segment of backbone 13, skin portion 14 surrounding the flesh portions part way, abdominal lining portion 15 and a plurality of small bones, bone 16 being typical, which extend through the steak essentially perpendicularly to the broad surface 17 of the steak.

FIG. 2 illustrates a second form of fish steak 18 cut from a bottom fish such as a halibut. This steak comprises bone assembly 19, flesh portions 20 and 21 and a skin portion 22 surrounding the flesh portions.

FIG. 3 illustrates one embodiment of an implement used for removing backbone portions from fish steaks. For purposes of this disclosure the implement is termed a tongs. Tongs 23 comprises a handle 24 and two bifurcated arms 25 and 26 extending from end 27 of the handle generally at a right angle to the long axis of the handle. Ends 28, 29, 30 and 31 of the arms are contoured to enhance their capability for grasping the backbone portions. In use the tongs is held with the thumb and forefinger of a hand against the arms with the handle grasped in the remaining three fingers of the hand. The ends of the arms are then inserted into the steak surrounding the backbone portion and pressed together by the thumb and forefinger to engage and remove the bone portion.

FIG. 4 illustrates an implement 32, used for separating skin and abdominal lining portions from fish steaks. This implement comprises a handle 33 and a blade 34. The long axis of the blade extends essentially at an angle in a range of 70° to 90° with 90° preferred to the long axis of the handle and from end 35 of the handle. Broad surfaces 36 and 37 of the blade are perpendicular to the long axis of the handle. The blade is sharp on both edges 38 and 39 and, in the preferred embodiment shown, the blade is pivotally connected so that it can fold into a cavity in the handle. The handle is a tube 40 having a rectangular cross section. Pin 41 extends through hole 42 in hub 43 of the blade and through hole 44 in side 45 of the handle and hole 46 in side 47 of the handle. (Hole 46 is not visible in this view.) The hub has two flats 48 and 49 and is engaged by spring tab 50 formed in top 51 of the handle by cutting slits 52 and 53 into the top. When the tab engages flat 48 the blade is held in its use position, as shown. When the blade is pivoted into the hollow of the handle through an opening 54 in bottom 51', the opening not being visible in this view, the tab engages flat 49 and holds the blade in its non-use or retracted position.

Extension 55 and 56 on the blade fit in slots in the handle, slot 57 being typical when the blade is in its non-use position and facilitate moving the blade without touching its sharp edges.

FIG. 5 illustrates a tweezers 58 used for removing from a fish steak bone portions such as bone 16 and skin and lining portions after they have been cut free from the flesh portions by the implement shown in FIG. 4. Arms 59 and 60 are attached to each other at ends 61 and 62 and tips 63 and 64 of the arms are pressed together when the arms are pressed toward each other to grasp the bone or skin or lining portions.

The tweezers may be integrated into the handle of the tongs or the handle of the FIG. 4 implement. FIG. 6 illustrates implement 65 which integrates a tweezers 66 into end 67 of handle 68 of an implement 69 similar to that shown in FIG. 4.

Figure 7:
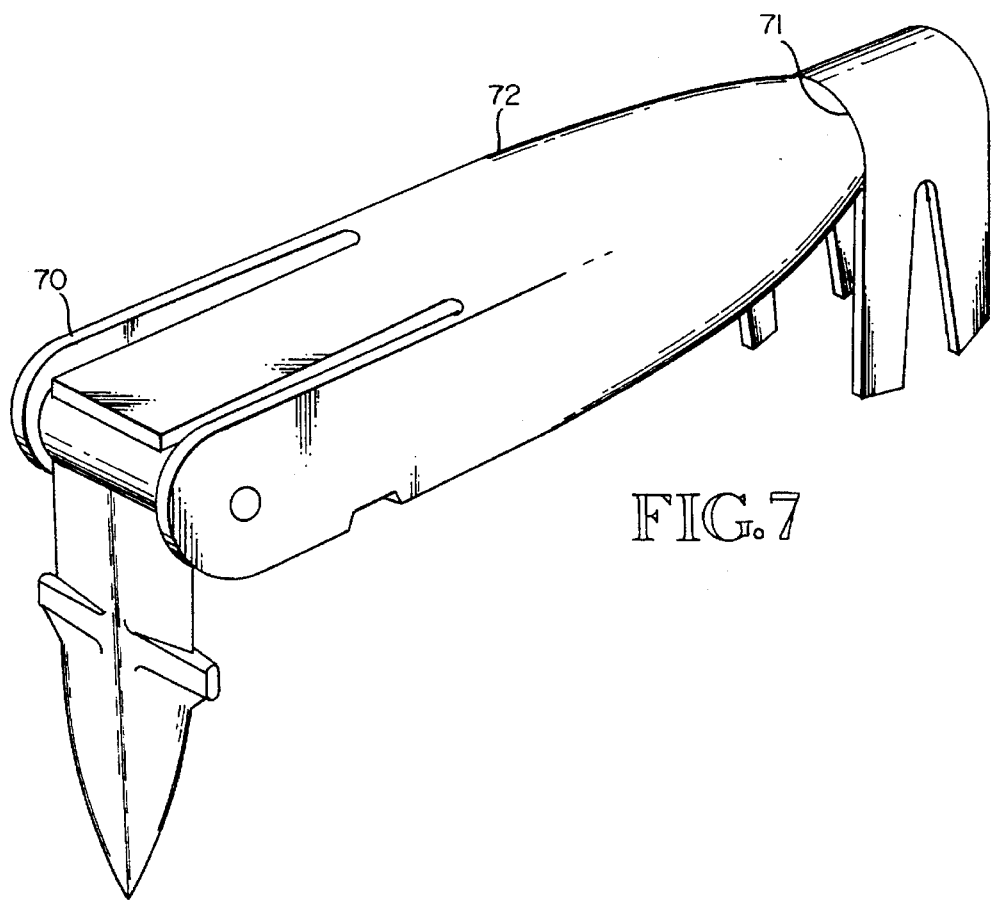
FIG. 7 illustrates an implement combining the implements of FIG. 3 and FIG. 4.

FIG. 7 illustrates the tongs of FIG. 3 and blade of FIG. 4 incorporated at opposite ends 70 and 71 of handle 72.

In all the implements which comprise the subject apparatus various components may be shaped to resemble fish or other sea life to enhance the aesthetics of the apparatus. Also, the inner surfaces of the tips of the tongs and tweezers may be specially contoured or otherwise surfaced to enhance the gripping power of the implements while accommodating the fragility of some of the materials being gripped. Slits in the tips 63 and 64 of the tweezers of FIG. 5, slit 73 being typical, help meet this capability.

It is considered to be understandable from this description that the subject invention meets its objectives. The apparatus comprises a combination of implements for expeditiously removing the skin and abdominal lining and bone portions from a fish steak at the time of serving. The implements are easy to use, economical to manufacture and aesthetically pleasing.

It is also considered to be understood that while certain embodiments of the invention are disclosed herein, other embodiments and modifications of those disclosed are possible within the scope of the invention which is limited only by the attached claims.

I claim:

1. Apparatus for removing bone, skin and abdominal lining portions from a fish steak, said steak comprising a backbone portion, a plurality of bone portions extending through said steak, flesh portions and skin and abdominal lining portions, said apparatus comprising an elongated handle having a first end and a second end; a double-edged blade attached to said first end by a transverse pivotal connection, said pivotal connection being such that said blade is movable between an open in-use position and a closed position; said blade being oriented relative to said handle such that lateral motions of said handle effect cutting by said blade while in said open position; and tongs located at said second end, said tongs comprising a pair of arms extending perpendicular to the longitudinal axis of said handle and having tips configured to penetrate said flesh portions around said backbone portion and to be pressed against said backbone portion to grip it and enable removing said backbone portion from said steak.

2. The apparatus of claim 1 wherein said blade has first and second broad faces symmetrically disposed relative to flat plane and said pivotal connection has an axis lying in said plane and being normal to said longitudinal axis, said flat plane being at an angle to said longitudinal axis in a range of 70° to 90° when said blade is in said in-use position.

* * * * *